July 24, 1962 M. D. RUST Re. 25,206

MOISTENING ASSEMBLY FOR COTTON PICKING SPINDLE

Original Filed Jan. 30, 1959 7 Sheets-Sheet 1

INVENTOR.
Mack D. Rust
BY
Fleh and Swain
ATTORNEYS

MOISTENING ASSEMBLY FOR COTTON PICKING SPINDLE

Original Filed Jan. 30, 1959 7 Sheets-Sheet 2

INVENTOR.
Mack D. Rust

BY
Fleh & Swain
ATTORNEYS

July 24, 1962 M. D. RUST Re. 25,206
MOISTENING ASSEMBLY FOR COTTON PICKING SPINDLE
Original Filed Jan. 30, 1959 7 Sheets-Sheet 3
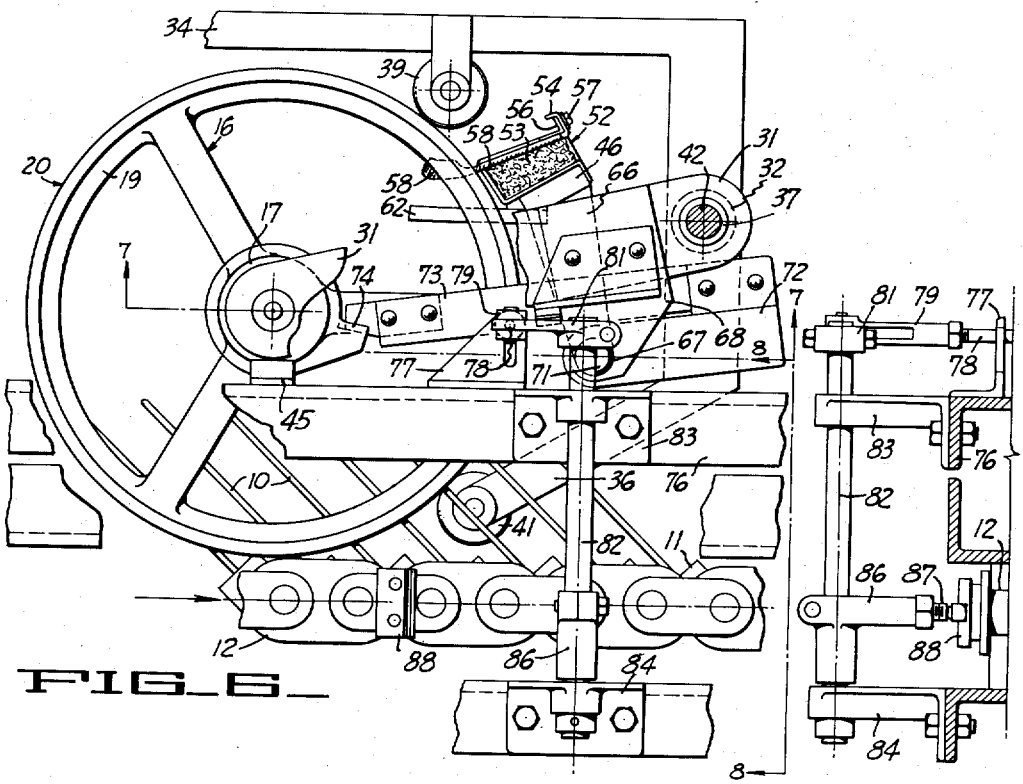
FIG_6_
FIG_8_
FIG_7_
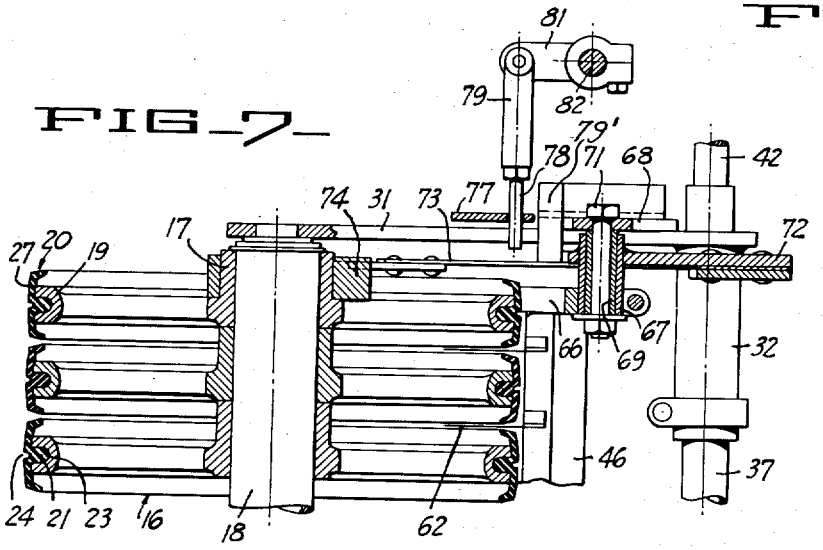
INVENTOR.
Mack D. Rust
BY
Fleckner and Swain
ATTORNEYS

MOISTENING ASSEMBLY FOR COTTON PICKING SPINDLE

Original Filed Jan. 30, 1959 7 Sheets-Sheet 4

INVENTOR.
Mack D. Rust

BY
Fleher & Swain
ATTORNEYS

MOISTENING ASSEMBLY FOR COTTON PICKING SPINDLE
Original Filed Jan. 30, 1959 7 Sheets-Sheet 5
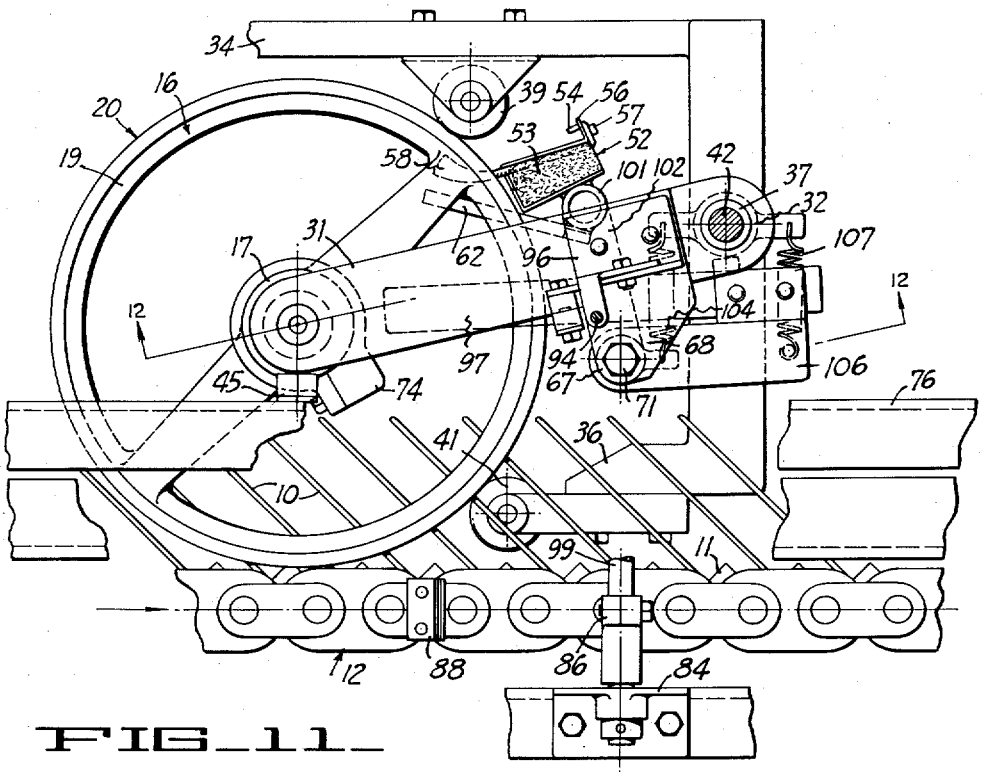
FIG_11_
FIG_13_
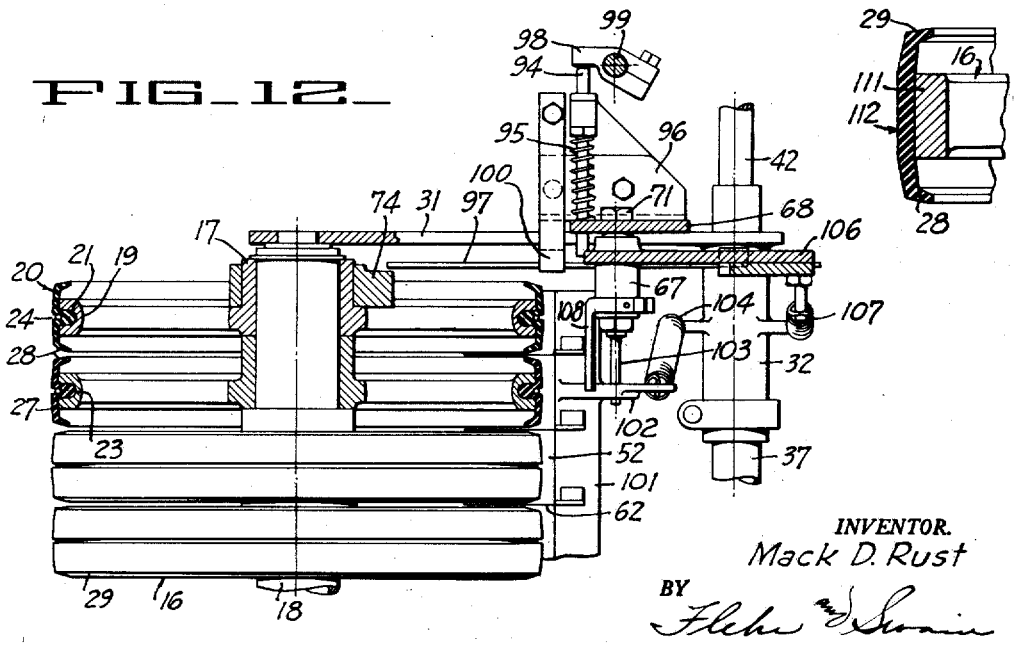
FIG_12_
INVENTOR.
Mack D. Rust
BY
Fleck and Sonnie
ATTORNEYS

MOISTENING ASSEMBLY FOR COTTON PICKING SPINDLE

Original Filed Jan. 30, 1959 7 Sheets-Sheet 6

INVENTOR.
Mack D. Rust

BY Fleh and Swain

ATTORNEYS

MOISTENING ASSEMBLY FOR COTTON PICKING SPINDLE

Original Filed Jan. 30, 1959 7 Sheets-Sheet 7

INVENTOR.
Mack D. Rust
BY
Fishburn & Swann
ATTORNEYS

United States Patent Office

Re. 25,206
Reissued July 24, 1962

25,206
MOISTENING ASSEMBLY FOR COTTON PICKING SPINDLE

Mack D. Rust, P.O. Box 777, Coalinga, Calif.

Original No. 2,971,315, dated Feb. 14, 1961, Ser. No. 790,229, Jan. 30, 1959. Application for reissue July 10, 1961, Ser. No. 126,796
19 Claims. (Cl. 56—42)

Matter enclosed in heavy brackets [ ] appears in the original patent but forms no part of this reissue specification; matter printed in italics indicates the additions made by reissue.

This application relates generally to machines for the field picking of cotton.

One type of cotton picking machine being used commercially employs a large number of picking spindles rotatably carried by slats, which in turn are carried by endless chains. The cycle of operation is such that the spindles progress through a station where moisture is applied to their outer surfaces, after which the spindles are thrust into plants while being rotated whereby fiber is contacted and wound upon the spindles. Thereafter the spindles are retracted from the plants and passed through a stripping station for removal of the fiber. The moistening operation is an important part of this complete cycle, particularly because the proper application of a suitable amount of moisture to the spindles contributes to the overall performance and picking efficiency of the machine. A spindle that is improperly moistened may fail to wind up fiber due to insufficient moisture to cause initial adherence of the fiber to the surface of the spindle. Too much moisture is likewise objectionable because it adds excessive and detrimental amounts of water to the picked cotton and contributes to erratic and unsatisfactory performance generally of the picking machine.

One type of moistening means which has been used in the past employs stationary means with which the spindles are brought into contact, and which serves to apply surface moisture. Moisteners of this type are unsatisfactory particularly because it is difficult to maintain operation with optimum application of moisture to the spindles. In other words there is a tendency for too much or too little moisture to be applied, and such equipment presents a difficult maintenance problem for continued field operations with a minimum amount of shutdown time.

Another type of moistening device has been proposed which employs wheels assembled on a vertical axis, and provided with rim portions made of rubber or like resilient material. The wheels are arranged whereby the spindles are drawn between the opposed resilient side faces of the rims. Wet sponges are disposed to wipe upon the outer peripheries of the rims, the intent being that the moisture so applied will be transferred to the surfaces of the spindles. This type of rotary moistener has been unsatisfactory for several reasons. The method employed for wetting the rims of the wheels does not result in satisfactory transfer of moisture to the spindles. There is a tendency toward clogging which necessitates frequent shutdown of the machine for cleaning. Clogging is caused mainly by accumulation of cotton fiber within the wheels and particularly in the lower part of the wheel assembly. It may be explained in this connection that although the stripping means may be reasonably effective some small amount of fiber inevitably remains upon the spindles, and some of this fiber is removed by and tends to accumulate in the moistening apparatus. Therefore with this type of moistening device removal of residual fiber is a detriment which impairs its effectiveness. A further disadvantage of this type of equipment (as previously constructed) is that it is difficult to service and to make field repairs. It is also subject to bending or breakage of wheels or other parts due to passage of foreign objects occasionally caught and carried past the moistening station.

In general it is an object of the present invention tc improve upon cotton picking machines, particularly witl respect to the means employed for the moistening operation.

Another object of the invention is to provide a cottor picking machine having efficient moistening means whicl also serves effectively to remove remaining cotton fiber without causing clogging.

Another object of the invention is to provide a cottoı picking machine having improved moistening means o the rotary type, and in which moisture is more effective ly and uniformly applied to the cotton picking spindle for optimum picking efficiency.

Another object of the invention is to provide a cotto picking machine having a moistener of the rotary typ in which means is provided for the disposal of remove fiber.

Another object of the invention is to provide a cotto picking machine of the above character in which th moistening means is provided with a fiber stripping mear operated at recurrent intervals to dispose of accumulate fiber.

Another object of the invention is to provide a moi tener which employs a wheel assembly capable of beir moved to an out of the way position with respect to tl normal path of movement of the picking spindles, thı facilitating field maintenance and repair and serving prevent damage to wheels or other parts due to passa of foreign objects.

Another object of the invention is to provide an ir proved moistening wheel construction which more effe tively applies a desired amount of moisture to tl spindles, and which also effectively removes any remai ing cotton fiber.

Further objects and features of the invention will a pear from the following description in which the pr ferred embodiment of the invention has been set forth detail in conjunction with the accompanying drawing.

Referring to the drawing:

FIGURE 6 is a view similar to view FIGURE 1 but an enlarged scale, and showing certain parts broken awa with other parts in section.

FIGURE 7 is a view taken along the sectional line 7— of FIGURE 6.

FIGURE 8 is a detail view taken along the sectioı line 8—8 of FIGURE 6.

FIGURE 11 is a view like FIGURE 6, but showing other embodiment.

FIGURE 12 is a cross sectional view taken along line 12—12 of FIGURE 11.

Figure 1:
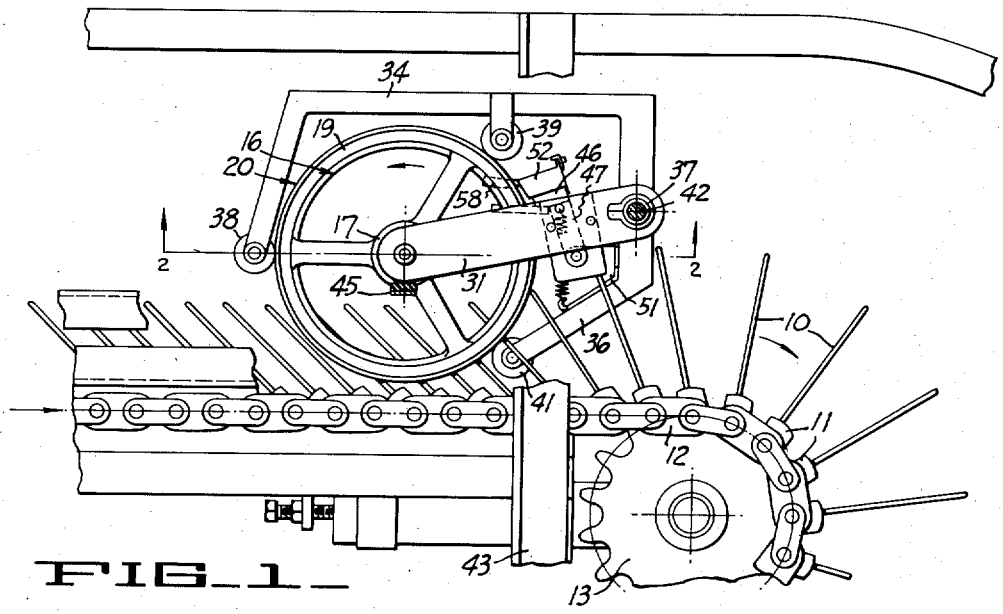
FIGURE 1 is a plan view illustrating a portion of cotton picking machine, and in particular showing moistening means in accordance with the prese invention.
Figure 2:
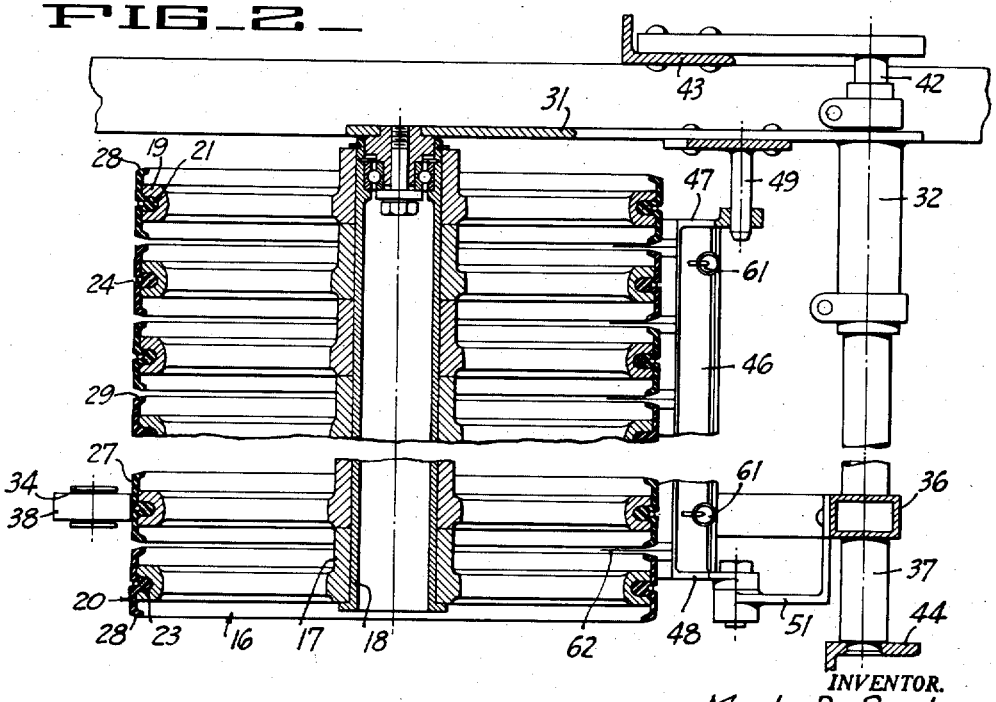
FIGURE 2 is a cross sectional view taken along the li 2—2 of FIGURE 1.
Figure 4:
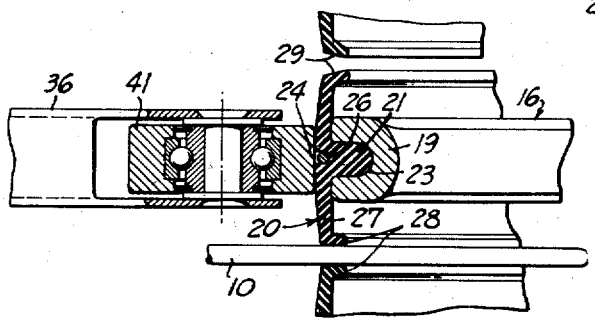
FIGURE 4 is a cross sectional detail taken along t line 4—4 of FIGURE 3.
Figure 14:
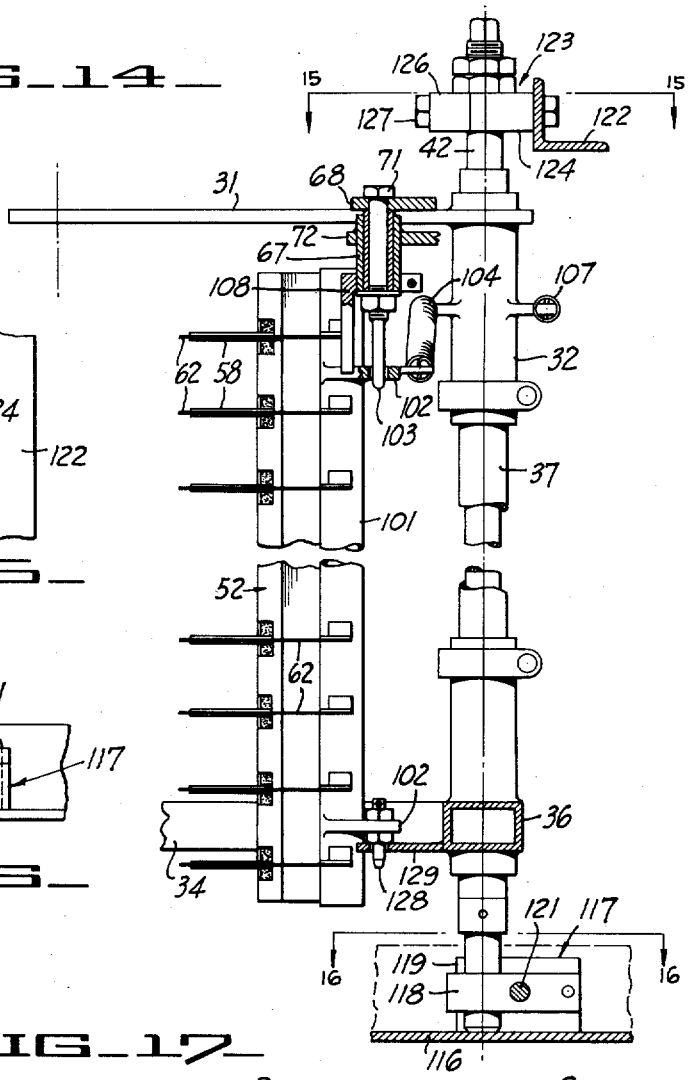
Figure 15:
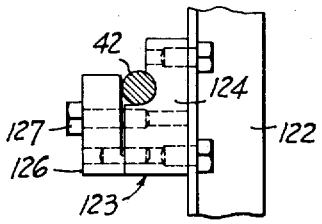
Figure 16:
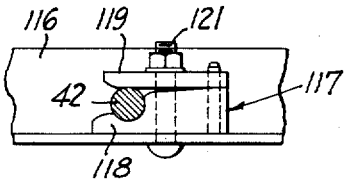
Figure 17:
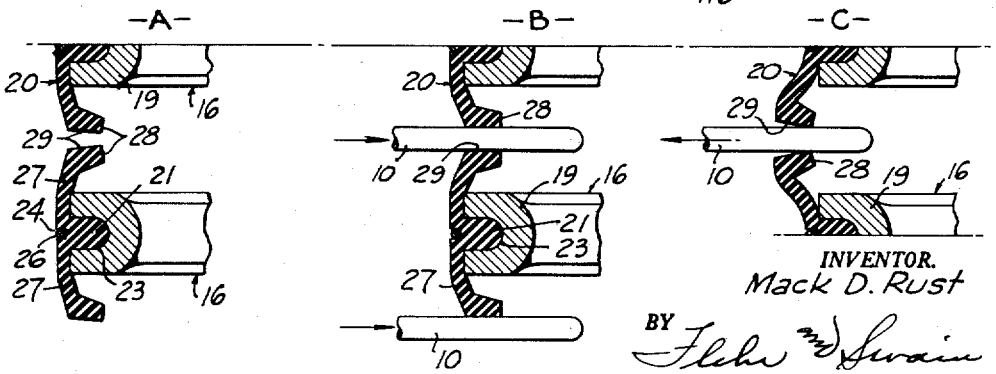
Figure 18:
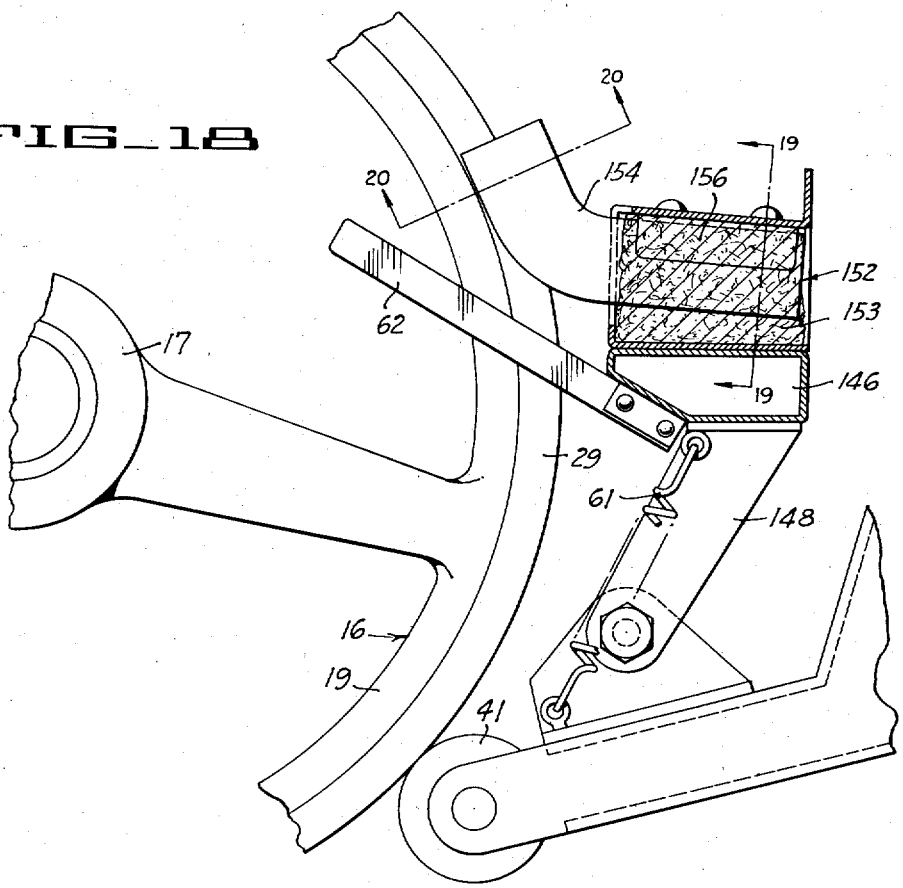
Figure 20:
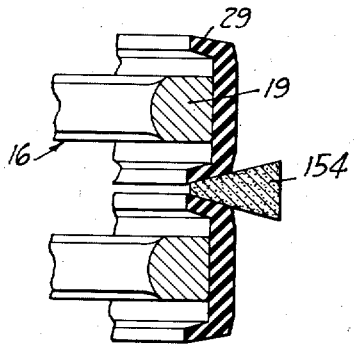
Figure 19:
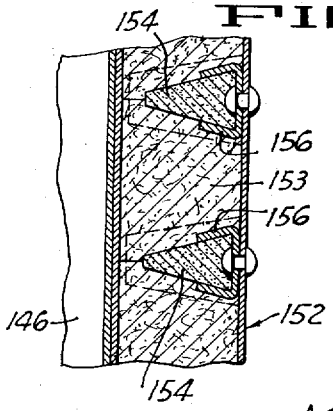

FIGURE 13 is a cross sectional detail showing a modi-
d type of moistening wheel.
FIGURE 14 is an elevational view in section illustrating
: embodiment of FIGURES 11 and 12 together with
:ans for maintaining the entire assembly.
FIGURE 15 is a cross sectional detail taken along the
e 15—15 of FIGURE 14.
FIGURE 16 is a cross sectional detail taken along the
e 16—16 of FIGURE 14.
FIGURE 17 is an elevational view with parts broken
ay and shown in section.
FIGURE 18 is a cross sectional detail similar to FIG-
:E 3, but showing another embodiment.
FIGURES 19 and 20 are cross-sectional details taken
ng the lines 19—19 and 20—20 respectively of FIG-
:E 18.
FIGURE 1 illustrates a portion of a cotton-picking unit,
h as is incorporated in a machine of the type disclosed
Patent Nos. 1,894,198, 2,058,514, 2,085,046, 2,466,969,
l 2,699,638. The picking spindles 10 are in the form
cylindrical shaped metal rods, rotatably journaled in
.rings carried by the slats 11. The slats in turn have
ir upper and lower ends attached to the carrying chains
which engage sprockets 13 at the forward and rear
s of the picking unit. The spindles carried by each
are evenly spaced in a vertical direction. When the
:hine is in operation the sprockets 13 rotate continu-
ly and the chains carry the spindles and slats through
various operating stations. Assuming that moisture
been applied to the spindles, they are thrust into plants
n which the machine is operating with rotation of
spindles whereby when they contact exposed
on fiber, the fiber is wound upon the spindles and
:ed from the bolls. Then the spindles retract from
plants and pass through a stripping station where the
ınd fiber is stripped lengthwise from the spindles.
reafter the spindles pass through a moistening sta-
where moisture is applied. FIGURE 1 shows the
dles passing through the moistening station where
stening means is provided in accordance with the
ent invention.
he moistening means shown in FIGURES 1 and 2
sists of a plurality of wheels 16 which are assembled to
te about a common vertical axis. While the details
onstruction may vary, in this instance each wheel in-
es a hub 17 which is assembled upon the hollow
ılar shaft 18. The metal portion 19 of the wheel
carries an annulus 20 formed of suitable resilient
erial, such as natural or synthetic resilient rubber.
particular type of rubber annulus illustrated in FIG-
E 4 is T-shaped in section, with its portion 21 seated in
oove 23 formed in the metal rim portion 19. A cir-
ferential slot 24 formed in portion 21 serves to ac-
modate the tie cord or wire 26, by means of which
annulus is firmly attached to the wheel. Resilient
deformable rim portions 27 extend laterally from
sides of the wheel, and are provided with flange por-
s 28 that provide spindle contacting side faces 29.
will be presently explained these side faces receive
sture and serve to apply moisture to the surfaces of
spindles. The spacing between adjacent opposed
faces 29 is substantially less than the diameter of the
dles, whereby when a spindle is drawn between these
s, the flanges 28 are somewhat deformed in the man-
shown in the lower portion of FIGURE 4, to bring
faces 29 into frictional contact with substantial areas
ıe spindles. Note that opposed side faces 29 are con-
ent in a direction toward the axis of the wheel as-
ɔly. This construction is advantageous as will be
ently explained.
s means for supporting the wheel assembly in op-
ng position, I provide a frame including the upper
31 (FIGURE 1) which has its one end attached to
sleeve 32, and its other end journaled to the upper
of the tubular shaft 18. Adjacent the lower end of the wheel assembly I provide arms 34 and 36 (FIGURE 1) which are secured to a sleeve 37. These arms carry rollers 38, 39 and 41 (FIGURE 1) which engage the outer periphery of one of the lower wheels of the assembly, as for example the next to the lowest wheel as shown in FIGURE 2. It will be noted that rollers 38, 39 and 41 engage the rim of a wheel at circumferentially spaced points whereby the lower end of the wheel assembly is retained to rotate about the desired vertical axis. Sleeves 32 and 37 are fixed with respect to each other and are rotatably carried by a vertical shaft 42, the latter being mounted on portions 43 and 44 that are carried by the main frame of the machine. The construction just described permits the wheel assembly to remain in the normal operating position shown in FIGURE 1, in which it is in the path of movement of the picking spindles. When it is desired to make repairs, the wheel assembly together with the frame formed by arm 31 and arms 34 and 36 is swung outwardly about the axis of the support shaft 42, to a position in which it is not engaged by the spindles. It may be explained at this point that the axis of shaft 42 is spaced from the slat carrying chains 12 a distance that is somewhat greater that the normal spacing between the chains and the axis of shaft 18. Thus the force required to draw the spindles between the wheels for the direction of spindle movement shown in FIGURE 1, produces a force component tending to urge the wheel assembly toward the chains and the spindle carrying slats. Suitable stop means 45 can be provided to limit and maintain a desired optimum spaced relationship between the wheel assembly and the slats.

Figure 3:
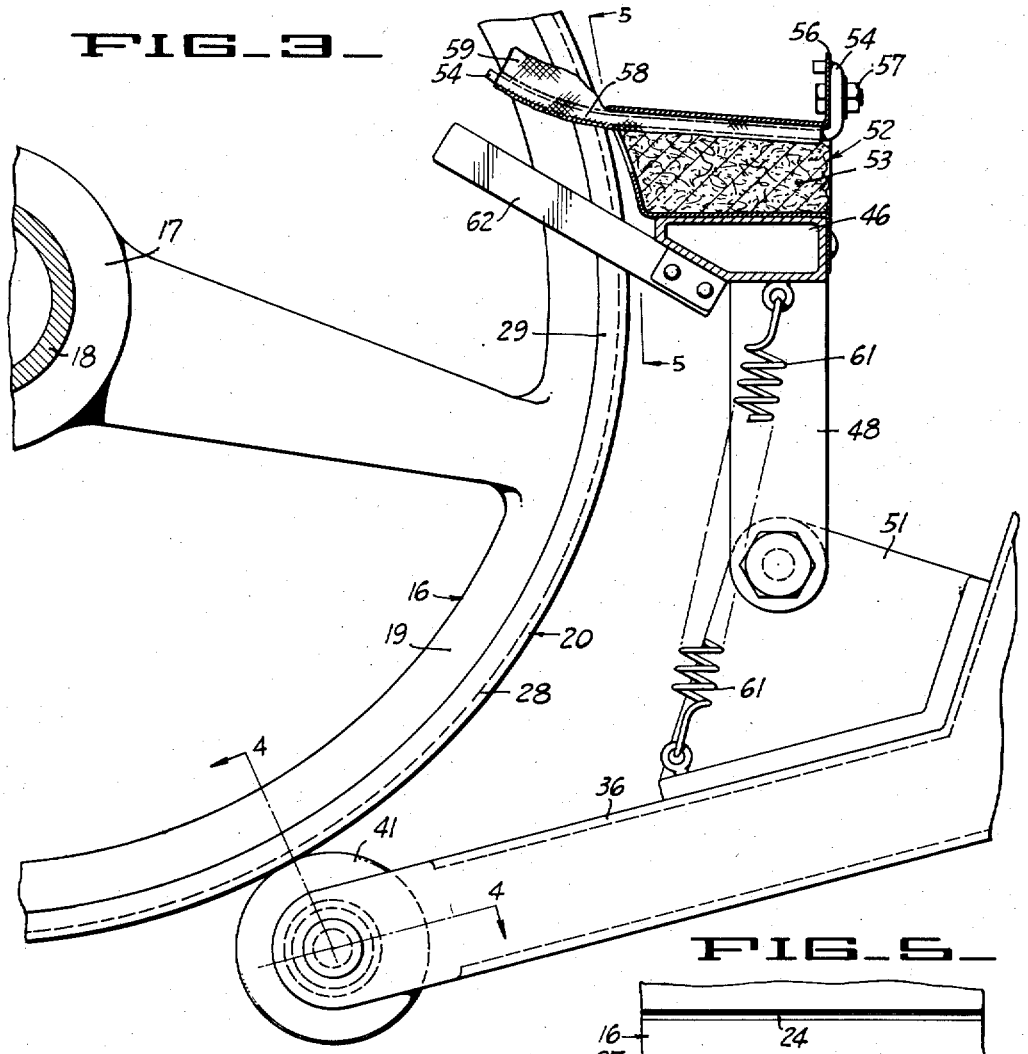
FIGURE 3 is an enlarged detail view showing the stri ping fingers and the moisture applying means, some the parts being shown in section.
Figure 5:
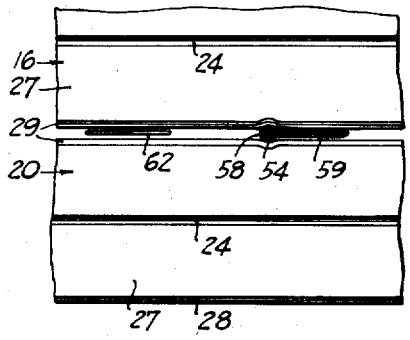
FIGURE 5 is an enlarged cross sectional detail tak along the lines 5—5 of FIGURE 3.

Means is provided for effectively applying moisture to the side faces 29 whereby such moisture is efficiently transferred to the picking spindles. The means consists of a vertically extending mounting member 46 which is carried by the upper and lower arms 47 and 48. Arm 47 is shown journaled upon a pin 49, which is mounted upon the arm 31, and arm 48 is shown pivotally attached to a bracket 51, which is attached to the lower frame arm 36. The mounting member 46 carries a container 52 formed of suitable material such as sheet metal, and which is filled with a water absorbent material, such as ordinary sponge fiber 53 (FIGURE 3). At the upper end of the container 52, suitable means such as a water reservoir (not shown) provided with an adjustable drip valve, can be employed for applying water to the sponge at a controlled even rate.

Suitable fingers 54, which may be made of spring wire, are shown being carried by the container 52 in such a manner as to extend between the rims of the wheels. In the particular construction illustrated, bent ends of the fingers 54 are removably secured to a flange 56 in the container 52, by means such as bolts 57. A material such as soft cotton cloth or cotton wicking 58 is wrapped about (i.e. folded over) the projecting ends of the fingers 54 and also extends into the container 52 whereby it is adequately wet by the sponge 53. Preferably the wicking provides a trailing edge 59 which aids the surface wetting of the side faces 29.

A tension spring 61 normally urges the mounting member 46, together with the fingers 54, toward the normal operating position shown in FIGURE 3. However, the mounting member 46 can be swung to the right as shown in FIGURE 3 past the dead center position of spring 61, thereby retracting the fingers from the wheels.

In addition to the moistening means I provide means for removing cotton fiber that may be removed from the spindles and which tends to cling to the rims of the wheels. Thus I provide a plurality of vertically spaced stripping fingers 62 which can be in the form of relatively thin flat bars having a thickness less than the spacing between adjacent side faces 29 of the rubber annuluses. It is convenient and desirable to mount these rods directly upon the mounting member 46. Therefore when the moistening fingers are retracted, the stripping fingers 62 are likewise retracted from the rims of the wheels. The length of the stripping fingers 62 preferably is such that they complete their retraction subsequent to retraction of the moistening fingers, thus preventing fiber being stripped from the fingers 62 from engaging and being caught by the moistening fingers. Likewise when the moistening fingers are returned from retracted to operating position of the same, the stripping fingers 62 first enter between the rims of the wheels, thus removing any accumulations of fiber before entry of the moistening fingers.

The machine described above operates as follows: Assuming that the spindles are entering the moistening station after fiber has been removed from the same, their paths of movement are aligned with the spaces between the rims of the wheels, and therefore the spindles are drawn between the side faces 29 in the manner illustrated in FIGURES 1 and 17. As a spindle enters between opposed side faces 29, some deformation of the resilient material occurs as shown at B in FIGURE 17 with the result that in the regions of engagement the flanges 28 tend to flatten out and thus provide a relatively large area of contact between side faces 29 and the surfaces of the spindle. Frictional engagement between the side faces 29 and the spindles causes the wheel assembly to rotate about its vertical axis, whereby the wheels rotate relative to the moistening fingers 54. As a result moisture is continuously applied to the side faces 29, and moisture is uniformly and effectively applied to the surfaces of the picking spindles. Withdrawal of a spindle is shown at C in FIGURE 17, and is accompanied by a shifting of the area of engagement to the inner edges of the surfaces 29. As previously mentioned some small amount of fiber remains upon the spindles from the preceding stripping operation. Such fiber is effectively removed when the spindles pass between and are then withdrawn from the moistening wheels, and tends to adhere to the rims of the wheels on or in the vicinity of the faces 29. The stripping fingers 62 effectively remove such adhering fiber from the rims of the wheels, and such removed fiber either remains upon the inner ends of the fingers 62, or drops through the lower end of the wheel assembly. It will be noted in this connection that the construction described leaves the lower end of the wheel assembly completely open and unobstructed by any lower supporting arm corresponding to the upper arm 31. Therefore fiber may drop through the wheel assembly without accumulating in such a manner as to cause clogging. Occasionally the operator may manually retract the moistening fingers 54 together with the stripping fingers 62, by swinging the mounting member 46 outwardly. This serves to strip off any fiber that may tend to cling upon the inner ends of the fingers 62.

Previous reference has been made to the fact that with the construction described the wheel assembly can be swung outwardly from the path of movement of the spindles, to facilitate making repairs. In addition this feature provides for free floating action whereby the wheel assembly may over-ride any foreign objects, such as sticks, chunks or the like, being carried by the slats or spindles, and which might otherwise injure the wheels or other parts of the machine. In other words the wheel assembly is free to swing outwardly a limited amount relative to the slats and thereafter automatically return again to a normal operating position.

FIGURES 6 and 7 illustrate a modification in which means is provided for automatically retracting the moistening and stripping fingers, and returning them to normal operating positions. The mounting member 46 for the moisture applying means in this instance is carried by the arms 66, the upper arm of which is carried by the sleeve 67. The corresponding lower arm is suitably pivotally attached to the arm 36, as in the manner illustrated in FIGURE 3. The arm 31 to which the wheel assembly is journaled carries a plate 68 to which the sleeve 69 attached. Bolt 71 extends downwardly through the sleev 69 and serves to retain sleeve 67, whereby the sleeve 6 together with arm 66 may swing about a vertical axi An arm 72 is attached to sleeve 67, and serves to carr a spring arm 73, having its free end adapted to be move vertically into the path of movement of a cam lug 7 that is fixed to the hub 17 of the uppermost wheel 1 A portion 76 of the main frame of the machine carrie a bracket 77 which is adapted to accommodate the re lease pin 78. This pin is carried at the lower end of link 79, which in turn is carried by the arm 81 on th horizontal shaft 82. The shaft is journaled to the brack ets 83 and 84 (FIGURE 8), which in turn are carried b portions of the main machine frame. A strike arm 8 is attached to shaft 82, and an adjustable tip such as ma be formed by the set screw 87, extends into the path o movement of a lug 88 attached to the slat carrying chai 12. When arm 73 is depressed it is initially engaged be neath the latch 79′ and thereby held in position for en gagement with cam lug 74, independently of the return o pin 78. FIGURE 7 shows the arm 73 engaged b latch 79′.

Operation of the embodiment shown in FIGURES 6– is as follows: Normally the parts are in the operatin positions shown in FIGURE 6. At recurrent intervals depending upon the number of lugs 88 which are pro vided, the shaft 82 is rocked to cause the pin 78 to dis lodge the spring arm 73 downwardly. This causes th free end of this arm to be moved into engagement be neath latch 79′ and brought into the path of movemen of the cam lug 74, with the result that arm 73 togethe with the mounting member 46 and the moistening an stripping fingers attached to the same, are moved to re tracted positions with respect to the wheels, and there after permitted to return to their normal positions. Suit able spring means (not shown), is applied to the mount ing member 46 to urge the same toward normal operat ing position, whereby it automatically returns to this posi tion after the lug 74 passes the arm 73.

Figure 9:
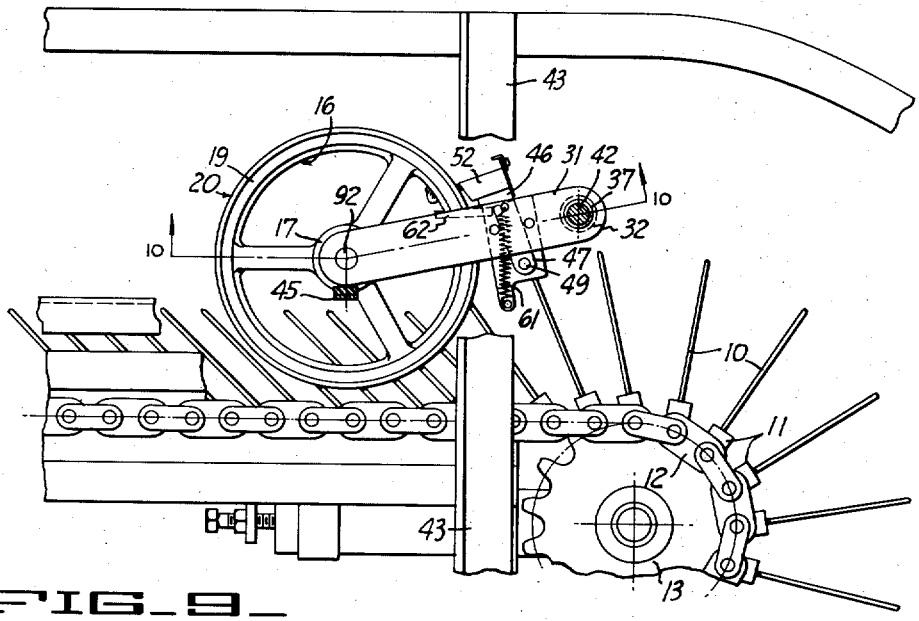
FIGURE 9 is a plan view like FIGURE 1, but showi another embodiment.
Figure 10:
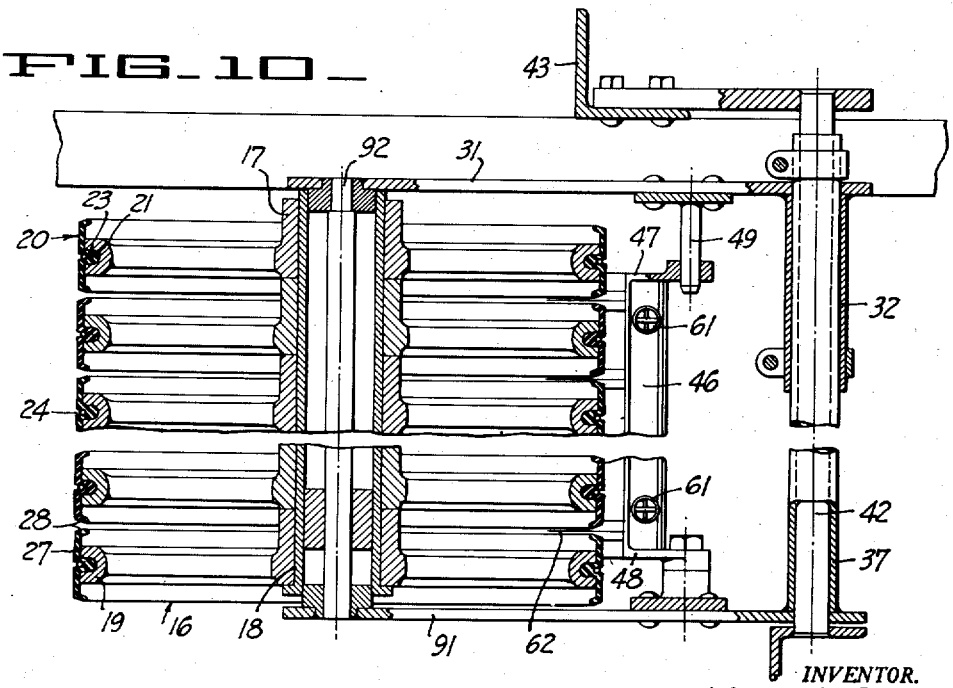
FIGURE 10 is a cross sectional view taken along t line 10—10 of FIGURE 9 and on an enlarged scale.

In some instances it may be desirable to omit the retaining rollers 38, 39 and 41 incorporated in the preceding embodiments, and use instead a conventiona shaft bearing at the lower end of the wheel assembly Such a modification is shown in FIGURES 9 and 10. In this instance, an arm 91, similar to the upper arm 31 is attached to the lower end of sleeve 37. The free end of this arm is attached to the lower end of shaft 92 extending between the arms 31 and 91. Suitable upper bearing means is provided between the tubular shaft 18 and the stationary shaft 92.

FIGURES 11 and 12 illustrate another embodiment of the invention in which means is provided for automatically moving the moistening and stripping fingers between normal operating and retracted positions. In this instance the bracket 96 is mounted upon arm 31, and carries the vertically slidable release pin 94, which is urged upwardly by the compression spring 95. The spring arm 97 is adapted to be engaged by the lower end of pin 94, and moved downwardly to bring its free end into operative engagement with the cam lug 74. The upper end of pin 94 is engaged by the finger 98 on shaft 99, this shaft corresponding to the shaft 82 of FIGURE 6. The arm 86 on shaft 99 is adapted to be engaged by the lug 88 on the slat carrying chain 12. Latch 100 corresponds with latch 79′ of FIGURE 7 and functions in the same manner.

The embodiment of FIGURES 11 and 12 further differs from FIGURES 6 and 7 in that the tubular mounting member 101 is provided, in place of the mounting member 46. The arms 102, corresponding to arms 66 of FIGURE 6, are likewise modified as to form, and as in the previous embodiments serve to pivotally carry the mounting 101 together with the moisture applying fingers the stripping fingers, for movements between their rating and retracted positions.

The lower end of bolt 71 is extended to form a pin upon which the upper arm 102 is pivoted. The lower n can be provided with a similar pivotal connection, ereby the assembly including the mounting 101 can readily removed or applied. Tension spring 104 dably urges the mounting and moistening means to-d the wheels. The arm 106 is carried by sleeve 67 l in turn carries the spring arm 97. Arm 106 is urged a counter clockwise direction by spring 107. A finger 3 is attached to sleeve 67, and extends to engage and ate arm 102 and mounting 101 when arm 97 is ated by cam 74. This provides a lost motion con-tion which employs the tension of spring 104 to re-n the moistening means to operating position.

While it is desirable to secure the resilient rubber to rims of the wheels in the manner illustrated in GURE 4, the simpler arrangement illustrated in FIG-E 13 can be employed. In this instance the metal tions 111 of the wheels provide flat cylindrical faces which the medial portion of the resilient rubber an-us 112 is securely bonded. Such bonding is desirable cause it prevents any possible separation of the resilient terial from the metal, which permits foreign material enter and thus interfere with the desired form of the ns.

FIGURES 14–16 illustrate novel means for mounting shaft 42 whereby the entire moistening assembly, luding the wheels may be quickly removed. The ver end of the shaft 42 is secured to a frame member 6 of the machine by a clamp 117. The clamp (FIG-RE 16) may consist of a block 118 notched to receive shaft, and a clamp plate 119 held in place by the mping bolt 121. The upper end of shaft 42 is secured the frame member 122 by the clamp 123. The latter IGURE 15) can consist of a notched block 124 to-her with the clamping plate 126 and screw 127.

FIGURE 14 also shows the pivotal connection for the ver end of mounting 101. The lower arm 102 carries pivot pin 128 which engages an aperture in the sup-rt arm 129.

It will be evident that the arrangement shown in FIG-RES 14–16 greatly facilitates repairs and servicing of machine under field conditions.

In the modification of FIGURES 18–20, the general ar-ngement is similar to FIGURE 3. The vertical mount-g member 146 (corresponding to member 46 of FIG-RE 3) is carried by upper and lower arms 148. These ms are pivotally mounted as in FIGURE 3. Member 6 carries a container 152 which is filled with sponge er 153. Means as described in connection with FIG-RE 3 serves to supply water to the sponge at a con-olled rate. Moisture applying members 154, formed of ater absorbent material, are carried by the retainers 156. ne end of each member 154 is within the container 152, d the other projecting end portion is wedge shaped IGURE 20) and disposed to engage the opposed faces of two adjacent wheels. These members 154 can be ade of various materials, such as synthetic sponge ma-rial, with or without an inner metal or plastic stiffener reinforcement, or cotton cloth or webbing applied over rubber or plastic core.

This application is a continuation-in-part of my co-ending application Serial No. 618,881, filed October 29, 956, and now abandoned, for "Moistening Assembly r Cotton Picking Spindles."

I claim:

1. In a cotton picking machine of the type having a ame and spindles movably mounted thereon for move-ent along a fixed path; means for applying moisture the spindles comprising an assembly mounted on said ame adjacent said path and including a plurality of ertically spaced wheels rotatable about means defining common vertical axis, the periphery of each wheel having resilient material thereon providing deformable spindle-engaging side faces, the side faces of adjacent wheels being vertically spaced to permit spindles moving along said path to be drawn between the same, said spacing being normally less than the diameter of the spindles whereby the spindles frictionally engage and deform said side faces and rotate said wheels, said assembly being mounted on said frame for swinging movement about a fixed axis spaced from said common axis whereby said assembly is mounted on said frame for movement from a normal position in which the peripheries of said wheels are adjacent said path to a displaced position outwardly of said path.

2. A machine as defined in claim 1 including stop means on said frame, engageable with said assembly, to limit the movement thereof in a direction toward said fixed path.

3. A machine as defined in claim 1 wherein said means defining said common axis is supported on said assembly solely from the upper end thereof, and retention means on said assembly engaging the periphery of at least one of said wheels at the lower end of said plurality of wheels at circumferentially spaced points for holding said common axis in vertical orientation.

4. A machine as defined in claim 1, wherein said spindle-engaging side faces are defined by resilient flanges, adjacent spaced flanges being inwardly convergent toward said common axis.

5. In a cotton picking machine of the type having a frame and spindles movably mounted thereon for movement along a fixed path; means for applying moisture to the spindles comprising an assembly mounted on said frame adjacent said path and including a plurality of vertically spaced wheels rotatable about means defining a common vertical axis, the periphery of each wheel having resilient material thereon providing deformable spindle-engaging side faces, the side faces of adjacent wheels being vertically spaced to permit spindles moving along said path to be drawn between the same, said spacing being normally less than the diameter of the spindles whereby the spindles frictionally engage and deform said side faces and rotate said wheels, and moisture-applying members carried by said assembly and extending between adjacent opposed faces whereby to apply moisture directly to said side faces.

6. A cotton picking machine as defined in claim 5 together with means including elongated fiber-dislodging members extending between said opposed side faces to dislodge the fibers therefrom.

7. A machine as defined in claim 6 wherein said fiber-dislodging members extend inwardly between said wheels in a direction sloping rearwardly of the direction of movement of said side faces.

8. A machine as defined in claim 6 together with means mounting said fiber-dislodging members on said assembly for movement generally radially of said wheels whereby they may be withdrawn outwardly from between said side faces to strip accumulated fibers therefrom.

9. A machine as defined in claim 8 including means thereon for periodically retracting said fiber-dislodging members from between said side faces.

10. A machine as in claim 8 including means thereon for periodically retracting said fiber-dislodging members from between said side faces in timed relation to rotation of said wheels.

*11. In a cotton picking machine of the type having a frame and spindles movably mounted thereon for movement along a fixed path; shaft means, a wheel assembly carried on said frame adjacent said path and including a plurality of vertically spaced wheels assembled on said shaft means and rotatable about the axis thereof, the periphery of each wheel having resilient material thereon providing deformable spindle-engaging side faces, the side faces of adjacent wheels being vertically spaced to permit spindles moving along said path to be drawn between the*

*same, said spacing being normally less than the diameter of the spindles whereby the spindles frictionally engage and deform said side faces and rotate said wheels, and means including elongated fiber-dislodging members extending between said opposed side faces to dislodge fibers therefrom.*

*12. A machine as defined in claim 11 wherein said fiber-dislodging members extend inwardly between said wheels in a direction slanting toward the direction of movement of said side faces.*

*13. A machine as defined in claim 11 together with means mounting said fiber-dislodging members on said assembly for movement generally radially of said wheels whereby they may be withdrawn outwardly from between said side faces to strip accumulated fibers therefrom.*

*14. A machine as defined in claim 13 including means thereon for periodically retracting said fiber-dislodging members from between said side faces.*

*15. In a cotton picking machine of the type having a frame and spindles movably mounted thereon for movement along a fixed path; shaft means, a wheel assembly carried on said frame adjacent said path and including a plurality of vertically spaced wheels assembled on said shaft means and rotatable about the axis thereof, means engaging only the upper end of the shaft means and serving to support the wheel assembly, the periphery of each wheel having resilient material thereon providing deformable spindle-engaging side faces, the side faces of adjacent wheels being vertically spaced to permit spindles moving along said path to be drawn between the same at one side of said axis, said spacing being normally less than the diameter of the spindles whereby the spindles frictionally engage and deform said side faces and rotate said wheels, and retention means on said frame engaging the periphery of at least one of said wheels at the lower end of said wheel assembly at circumferentially spaced points for holding said assembly in a vertical axis.*

*16. A machine as defined in claim 15 wherein said spindle-engaging side faces are defined by resilient flanges, adjacent spaced flanges being inwardly convergent toward said common axis.*

*17. In a cotton picking machine of the type having a frame and spindles movably mounted thereon for movement along a fixed path; shaft means, a wheel assembly carried on said frame adjacent said path and including a plurality of vertically spaced wheels assembled on said shaft means and rotatable about the axis thereof, means engaging only the upper end of the shaft means and serving to rotatably support the wheel assembly, the periphery of each wheel having resilient material thereon providing deformable spindle-engaging side faces, the side faces of adjacent wheels being vertically spaced to permit spindles moving along said path to be drawn between the same, said spacing being normally less than the diameter of the spindles whereby the spindles frictionally engage and deform said side faces and rotate said wheels, and means including elongated fiber-dislodging members extending between said opposed side faces to dislodge fibers therefrom.*

*18. In a cotton picking machine of the type having a frame and spindles movably mounted thereon for movement along a fixed path; shaft means, a wheel assembly carried on said frame adjacent said path and including a plurality of vertically spaced wheels assembled on said shaft means and rotatable about the axis thereof, the periphery of each wheel having resilient material thereon providing deformable spindle-engaging side faces, the side faces of adjacent wheels being vertically spaced to permit spindles moving along said path to be drawn between the same at one side of said axis, said spacing being normally less than the diameter of the spindles whereby the spindles frictionally engage and deform said side faces and rotate said wheels, said spindle-engaging side faces being defined by resilient flanges, adjacent spaced flanges being inwardly convergent toward said common axis.*

*19. In a cotton picking machine of the type having a main frame and spindles movably mounted thereon for movement along a fixed path; a sub-frame, shaft means, a wheel assembly carried on said sub-frame adjacent said path and including a plurality of vertically spaced wheels assembled on said shaft means and rotatable about the axis thereof, the periphery of each wheel having resilient material thereon providing deformable spindle-engaging side faces, the side faces of adjacent wheels being vertically spaced to permit spindles moving along said path to be drawn between the same at one side of said axis, said spacing being normally less than the diameter of the spindles whereby the spindles frictionally engage and deform said side faces and rotate said wheels, said sub-frame being mounted on said main frame for swinging movement about a fixed axis spaced from the axis of said wheel assembly for movement from a normal position in which the peripheries of said wheels are adjacent said path to a displaced position outwardly of said path.*

References Cited in the file of this patent or the original patent

UNITED STATES PATENTS

| | | |
|---|---|---|
| 2,023,491 | Rust et al. | Dec. 10, 1935 |
| 2,458,531 | Rust | Jan. 11, 1949 |
| 2,485,845 | Rust | Oct. 25, 1949 |
| 2,525,184 | Rust | Oct. 10, 1950 |
| 2,567,301 | Rust | Sept. 11, 1951 |